United States Patent [19]

Martin et al.

[11] 4,321,887
[45] Mar. 30, 1982

[54] HIGH-DENSITY POULTRY CAGE SYSTEM AND MANURE HANDLING METHOD

[75] Inventors: Harlan W. Martin, New Holland; Harvey Z. Burkholder, Denver; Willis R. Voran, New Holland; Galen A. Winters, Conestoga, all of Pa.

[73] Assignee: Favorite Manufacturing, Inc., New Holland, Pa.

[21] Appl. No.: 226,497

[22] Filed: Jan. 19, 1981

[51] Int. Cl.³ ............................................. A01K 31/04
[52] U.S. Cl. ..................................................... 119/22
[58] Field of Search ........................ 119/22, 17, 18, 28

[56] References Cited

U.S. PATENT DOCUMENTS

| | | | |
|---|---|---|---|
| 2,309,458 | 1/1943 | Ingraham | 119/48 |
| 2,383,326 | 8/1945 | Lovell | 119/22 |
| 2,448,120 | 8/1948 | Petraske | 119/22 |
| 2,805,644 | 9/1957 | Lieberman | 119/22 |
| 2,946,309 | 7/1960 | Page | 119/22 |
| 2,970,567 | 2/1961 | Rubin | 119/22 |
| 2,987,038 | 6/1961 | Cole | 119/18 |
| 3,021,819 | 2/1962 | Krahn | 119/22 |
| 3,160,141 | 12/1964 | Crutchfield | 119/22 |
| 3,464,389 | 9/1969 | Seiderman | 119/22 |
| 3,662,420 | 5/1972 | Jordan, Jr. | 15/93 B |
| 3,768,442 | 10/1973 | Van Huis | 119/18 |
| 3,768,444 | 10/1973 | Van Huis | 119/22 |
| 3,783,829 | 1/1974 | Siciliano | 119/17 |
| 3,810,444 | 5/1974 | Conley | 119/22 |
| 3,867,903 | 2/1975 | Fleshman | 119/17 |
| 3,919,976 | 11/1975 | Meyer et al. | 119/28 |
| 4,242,809 | 1/1981 | Elder | 119/22 X |

*Primary Examiner*—Hugh R. Chamblee
*Attorney, Agent, or Firm*—Howson and Howson

[57] ABSTRACT

A cage and manure removal system for egg-laying poultry is disclosed. In the system, a bank of cages are disposed in pairs of rows in vertically-spaced tiers. A horizontally disposed manure dropping board overlies the cage rows in the lower tiers for collecting droppings excreted by poultry in the overlying cage rows. The droppings are periodically cleaned from the dropping boards by a manure scraping assembly which comprises a carriage mounted for movement along a monorail which overlies the cage bank and has a depending post mounting a series of augers adapted to travel along the top surfaces of the dropping boards. As the carriage advances and the augers rotate, the droppings are displaced inwardly on the dropping boards for collection in a collection pit located below the cage bank.

A method of handling manure to promote drying is also disclosed.

35 Claims, 4 Drawing Figures

HIGH-DENSITY POULTRY CAGE SYSTEM AND MANURE HANDLING METHOD

FIELD OF THE INVENTION

The present invention relates to automated equipment for confining, feeding, and collecting eggs from poultry. More particularly, the present invention relates to high-density cage systems for confining poultry and to apparatus for handling manure generated by caged poultry.

BACKGROUND OF THE INVENTION

For a number of years, there has been a trend toward the production of eggs by automated equipment. Customarily, this equipment includes a bank of cages for confining the poultry, automated feeding and watering apparatus associated with the cages, and conveyors for collecting eggs produced by the poultry and conveying them to one end of the cage bank for subsequent transfer to various processing equipment. Apparatus is provided in the cage bank for removing manure generated by the confined hens.

Various types of cage assemblies have been proposed for this purpose. Some assemblies include two or more rows of cages stacked vertically in stairstep or pyramidal fashion with inclined dropping boards or deflecting shields located above the lower rows of cages. In other cage systems, such as the Cal-Aire system sold by the assignee of the present application, the cages are of a reverse configuration and are offset sufficiently in the horizontal direction as to eliminate completely the need for manure dropping boards. In yet other systems disclosed in the art, cages are stacked vertically one above the other and various types of manure handling devices are utilized to take care of the droppings from the caged hens.

While various prior art cage systems and manure handling apparatus have certain advantages, they also have certain limitations. For instance, while the stairstep or pyramidal cage arrangements provide a reasonable density of hens per linear foot of cage, the overall width of the cage systems at the base requires more floor space than if the cages were stacked vertically one above the other. With the costs of constructing poultry houses increasing, it should be apparent that there is a demand for a poultry cage system which permits a maximum density of birds to be housed within a minimum of floor space within the poultry house while having an overall height which is sufficiently low as to enable a workman to be able to reach into the cages in the uppermost rows.

An example of a pyramidal stacked deck cage system utilizing manure scraping blades is disclosed in U.S. Pat. No. 3,783,829 and U.S. Pat. No. 3,768,442. Examples of vertically stacked cages utilizing fixed blade manure removal systems are set forth in the following U.S. Pat. Nos.: 2,309,458; 2,383,326; 2,448,120; 2,946,309; 2,805,644; 2,987,038; 2,970,567; 3,768,444; 3,810,444; and 3,867,903. Examples of tractor-mounted manure scrapers designed to scrape the floor beneath poultry cages are set forth in U.S. Pat. Nos. 3,160,141 and 3,662,420, the latter patent disclosing the use of an auger for displacing manure laterally with respect to the path of movement of the tractor. A barn floor cleaner utilizing an auger which pivots about a vertical axis in a circular path is disclosed in U.S. Pat. No. 3,021,819.

While each of the various patented cage systems and manure handling devices may function satisfactorily for its intended purpose, none provides a high-density cage system which requires a minimum of poultry house floor space yet which is capable of being serviced readily by a workman. Moreover, none provides such a cage system which provides a free flow of air among the caged hens so as to insure adequate ventilation, and none discloses manure removal apparatus which operates efficiently in a minimum of space to clear manure from beneath stacked poultry cages.

OBJECTS OF THE INVENTION

With the foregoing in mind, it is an object of the present invention to provide an improved high-density poultry cage system which overcomes the limitations of prior art systems.

It is another object of the present invention to provide a novel apparatus for efficiently handling manure generated by poultry confined in stacked cages in a poultry house.

As a further object, the present invention provides an improved method and apparatus particularly useful in drying manure before it is deposited in a collection pit in a poultry house.

SUMMARY OF THE INVENTION

More specifically, the present invention provides a high-density cage system which comprises a bank of cages disposed in vertically-spaced tiers each having a pair of horizontally spaced caged rows with the cage rows being aligned vertically with one another. A manure dropping board is disposed horizontally above the lower rows of cages, and manure handling means is provided for reciprocating back and forth across the dropping boards for displacing manure fallen thereon toward the center of the cage bank for deposit in a collection pit located therebeneath. The manure handling means comprises a carriage which is adapted to travel underneath an elevated monorail extending lengthwise above the cage bank and which has a depending post mounting at spaced vertical intervals a series of augers which overlie the dropping boards. Means is provided for displacing the carriage along the monorail and for rotating the augers as the carriage advances. Preferably, the carriage is advanced by means of a cable which extends lengthwise of the cage bank around a drive unit and around a capstan mounted in the carriage to provide the power for rotating the augers. The apparatus is particularly useful in a method of aerating the manure during the return trip of the carriage to facilitate drying. In the method, a long time delay elapses between the forward and reverse trips of the carriage, and during the reverse trip, the auger blades rotate in the same direction as they rotated during the forward trip to scrape the dropping boards.

BRIEF DESCRIPTION OF THE DRAWINGS

The foregoing and other objects, features and advantages of the present invention should become apparent from the following description when taken in conjunction with the accompanying drawings, in which.

DESCRIPTION OF PREFERRED EMBODIMENT

Figure 1:
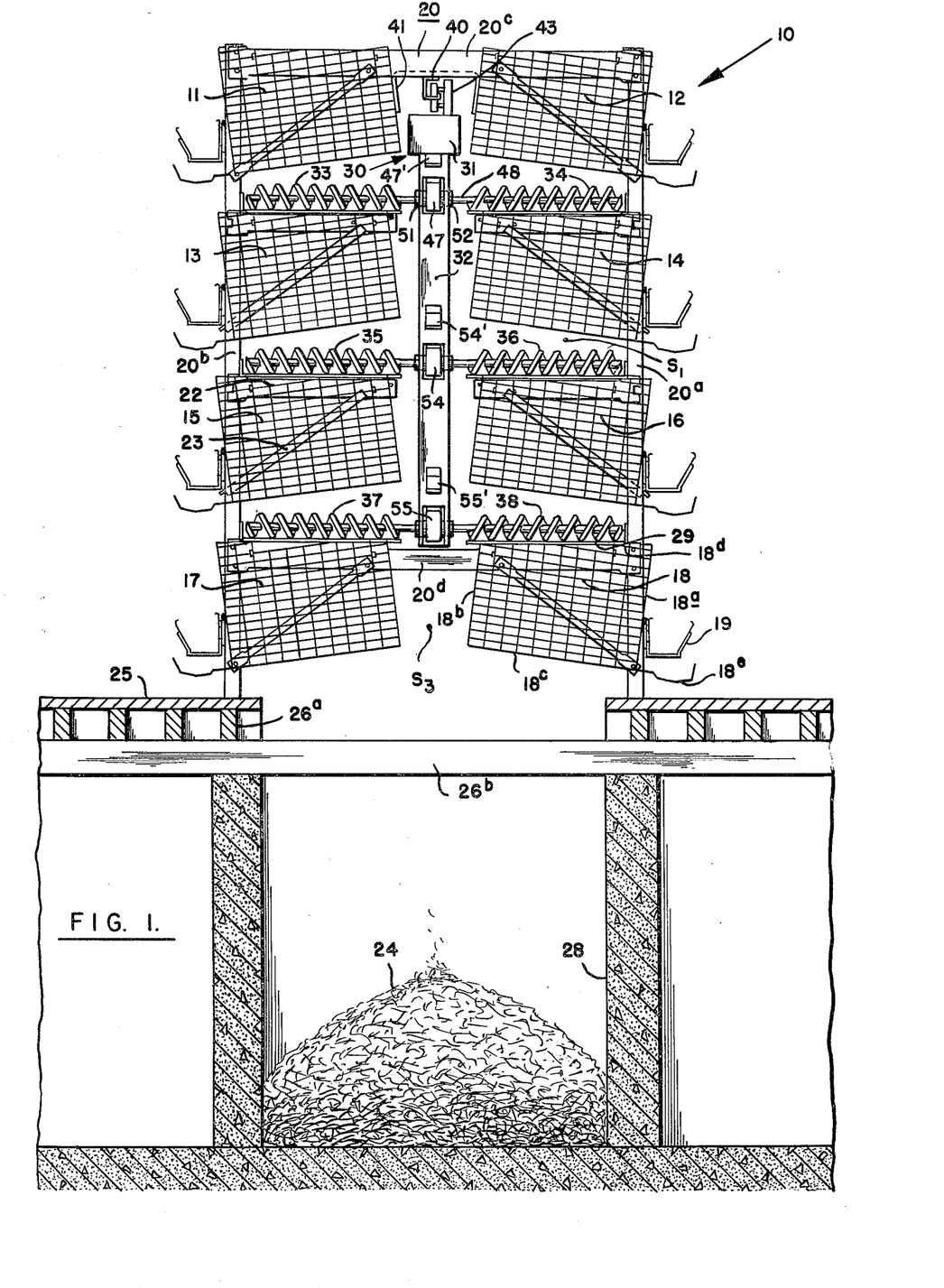
FIG. 1 is an elevational view of a high-density cage system which embodies the present invention.

Referring now to the drawings, FIG. 1 illustrates a high-density cage system 10 which embodies the present invention. The cage system 10 comprises a bank of cages 11–18 disposed in tiers of vertically-spaced horizontally-separated rows, such as the rows 11, 12; 13, 14; 15, 16; and 17, 18. Preferably, the cage rows are aligned vertically with one another with a space being provided between adjacent rows, such as the space $S_1$ between the upper intermediate tier comprising the rows 13 and 14 and the lower intermediate tier comprising the rows 15 and 16. The cage rows in each tier, such as the lowermost rows 17 and 18 are spaced apart horizontally to provide a space $S_3$ between the back panels of the cages for purposes which will be described.

Each cage in the system 10 is like in construction to the other. For instance, each cage, such as the lower right-hand cage 18, is fabricated of wire mesh and has a front panel 18a, a rear panel 18b, a bottom panel 18c, and a top panel 18d. The top panel 18d is disposed horizontally, and the bottom panel 18c inclines downwardly and outwardly and terminates in a receptacle 18e adapted to contain a conveyor belt (not shown) for collecting eggs laid by hens confined within the cage 18. A series of internal vertical partitions are provided at spaced intervals in each row to divide the cage row into individual compartments each confining several hens. A feed trough 19 overlies the conveyor receptacle 18e and is designed to supply feed to hens confined within the cage 18 by any of several well-known techniques (not shown) including the use of a chain movable longitudinally within the trough 19 in a closed circuit around the cage bank from a feed supply hopper located at one end of the cage bank. Suitable conventional means, such as nipple fountains are provided to supply water to the hens confined within the cages, as well known in the art. Typical mesh size for the panels is one inch by two inches, except for the top panel and the front panel 18a which have only vertical wires enabling the caged hens to extend their heads outwardly through the cage fronts for feeding from the trough 19.

Figure 2:
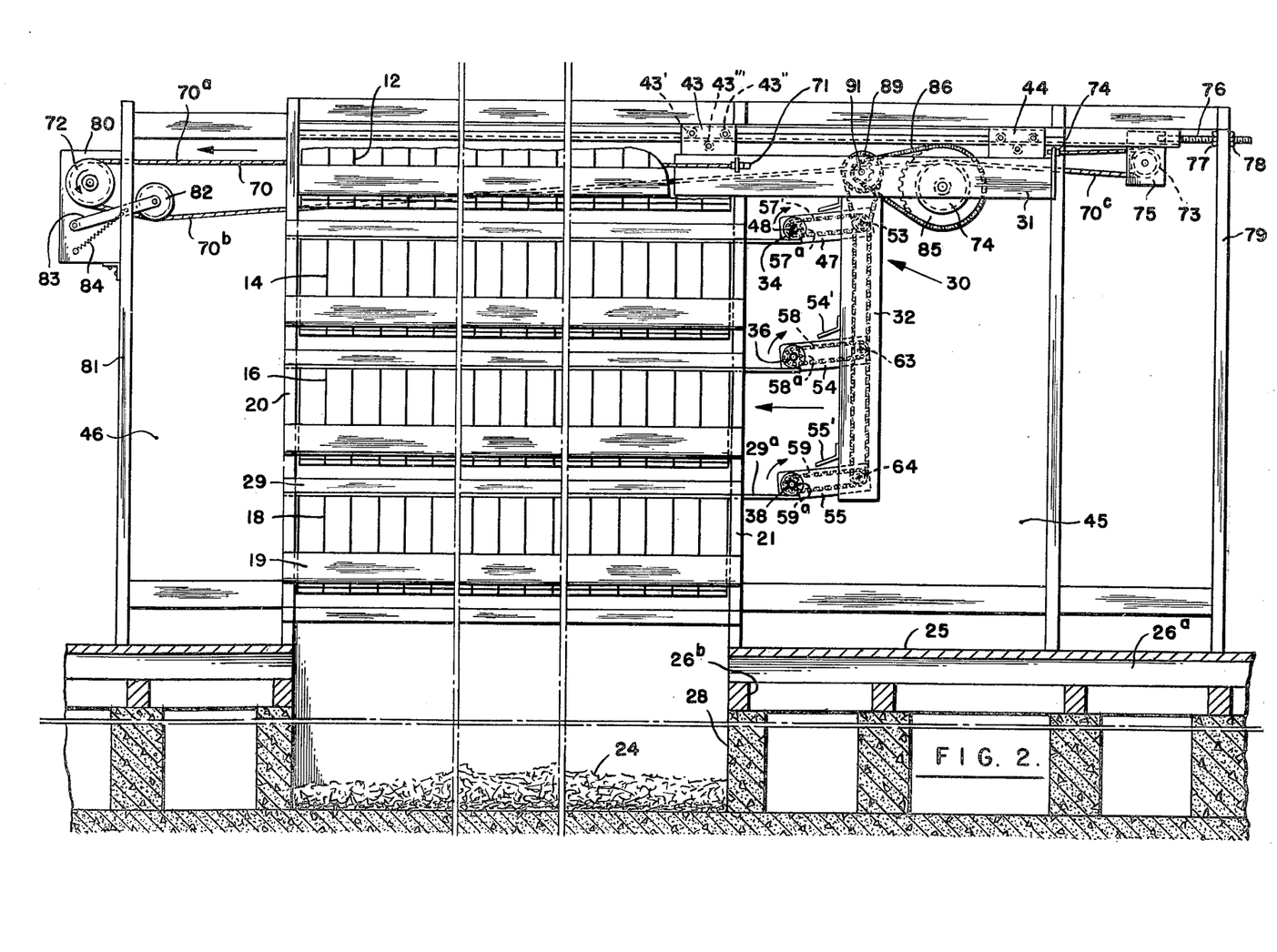
FIG. 2 is a longitudinally-foreshortened side elevational view of the cage system illustrated in FIG. 1.

The cages 11–18 are supported in vertically and horizontally spaced relation by upright frames, such as the frames 20 and 21 illustrated in FIG. 2. The frames 20 and 21 are typical of a number of upright frames located at spaced intervals, such as ten foot intervals, to support the cage rows. A typical frame, such as the frame 20 comprises a pair of vertically disposed uprights 20a and 20b connected together adjacent their upper ends by a cross member 20c which spans completely across the cage rows. A similar cross member 20d connects the frame members 20a and 20b adjacent their lower ends.

For purposes to be described, the two intermediate tiers of cage rows 13, 14, and 15, 16 are mounted to the uprights 20a and 20b in somewhat of a cantilever fashion, i.e. in a manner which provides an air gap completely around the rear, bottoms, and tops of the cages. To this end, a typical cage row in the intermediate tiers, such as the cage row 15, is supported by a bracket assembly comprising a horizontal member 22 which extends inwardly from the upright 20b and terminates short of the median or center of the cage bank inside the cage 15. An inclined brace 23 connects the arm 22 adjacent its outer end to the upright 20b at a lower level, thereby providing firm support for the cage row 15.

As well known in the art, the cage bank 10 is mounted alongside a series of like banks in a poultry house with aisles extending between adjacent banks. Preferably, the poultry house is constructed with a floor or walkway 25 supported on a series of joists 26a, 26b such as in the manner illustrated. While the floor 25 is customarily located above the bottom of a pit 28 which underlies all of the cage banks in the poultry house, individual pits may be provided only under the cage banks such as shown in FIG. 1. Manure deposited in a pile 24 in the pit 28 is periodically removed by conventional means.

For the purpose of enabling the droppings produced by the caged birds to be deposited in the pile 24, manure dropping boards are disposed horizontally above each of the cages in the lower three tiers. Preferably, each dropping board, such as the board 29, is supported directly on the top panel 18b of the cage row 18 and is thereby disposed horizontally. The dropping boards are preferably fabricated of a corrosion resistant material such as polyvinyl chloride.

The cage bank 10 is designed to be serviced readily by a workman of about average height. To this end, the vertical spacing between the dropping boards and the bottom panels of the immediately overlying cages is kept to a minimum in order to insure that the cages in the topmost rows 11 and 12 can be reached readily. This is achieved in the present invention by keeping the maximum vertical spacing between the dropping boards and the bottom panels of the immediately overlying cage row less than about ½ of the minimum height of the cage. As a result, the overall height of the cage bank when used in conjunction with an underlying manure collection pit is less than 77 inches. About 3 inches is added when an endless manure collection belt is used under the lowermost tier of cages. The overall horizontal width of the cage bank, including the feed troughs is about 62 inches. Thus, it should be apparent that the cage bank 10 occupies a minimum amount of floor space and has a minimum height, thereby allowing even the uppermost cages to be readily accessible by workmen. Moreover, the size and horizontal disposition of the manure dropping boards facilitates the inward and upward flow of ventilating air through the cage bank.

For the purpose of displacing toward the center of the cage bank droppings which fall on the dropping boards, manure handling apparatus 30 (FIG. 2) is provided. The apparatus 30 comprises a carriage 31 adapted to travel lengthwise of the cage bank in the horizontal space between the backs of the cages 11 and 12 in the uppermost tier. The carriage 31 has an elongated post portion 32 which depends vertically downward therefrom in the space between the rear panels of the cages in the lower tiers. A series of pairs of auger blades 33, 34; 35, 36; and 37, 38 (FIG. 1) are carried at vertically spaced intervals by the post 32 and are adapted to overlie the dropping boards on the cage rows in the lower tiers such as the auger 38 overlies the dropping board 29. The augers 33–38 are pitched to displace manure droppings inwardly on the dropping boards toward the center of the cage bank when they rotate and the carriage 31 is advanced lengthwise of the cage bank 10. The droppings fall off the inner ends of the dropping boards and onto the pile 24 located in the collection pit 28.

In order to mount the carriage 31 for guided movement in the cage bank 10, an elevated monorail 40 is disposed lengthwise of the cage bank 10. Preferably, the monorail 40 has a J-shaped cross section and is fastened to the underside of the top frame braces 20c. Intermediate the frame braces 20c, the monorail 40 is supported on the back panels of the cages by means of an inverted U-shaped plate 41 which extends across the top of the monorail and is connected by suitable fasteners to the back panels of the cages. The carriage 31 depends from the monorail 40 and is mounted for movement relative thereto by a pair of trucks 43, 44 having wheels 43', 43" which ride in the J section of the monorail and a wheel 43''' which rides along the underside of the monorail 40. The other truck 44 is spaced rearwardly from the front truck 43 in the manner illustrated in FIG. 2.

For the purpose of accommodating the carriage 31 when in its home or storage position, the monorail 40 is extended rightward beyond the right or near end of the cage bank 10 and a storage bay 45 is provided. Another bay 46 is provided at the left-hand or far end of the cage bank 10, and this bay 46 accommodates the feed hopper and ancillary devices normally used in combination with the cage bank 10. For purposes of clarity, however, such ancillary devices have been omitted from the drawings.

The manure scraping assembly 30 operates when the carriage 31 advances leftward in the direction indicated by the arrow in FIG. 2 to scrape droppings from the dropping boards. For this purpose, all the augers, such as the augers 33 and 34, comprise helical blades mounted on a common shaft, such as the shaft 48 (FIG. 1). The auger blades 33 and 34 are of opposite pitch so that, when rotated clockwise in the direction indicated by the arrows in FIGS. 2 and 3, the blade 33 scrapes the droppings rightward toward the center, and the blade 34 scrapes the droppings leftward toward the center. Preferably, the blades have an outside diameter of three inches, a pitch of three inches, and a length of approximately eighteen inches. The blades are preferably rotated at a velocity of 400 rpm. with the carriage advancing at a speed of 25 feet per minute. Thus, the augers rotate through about sixteen revolutions per foot of translation of the carriage 31.

Figure 3:
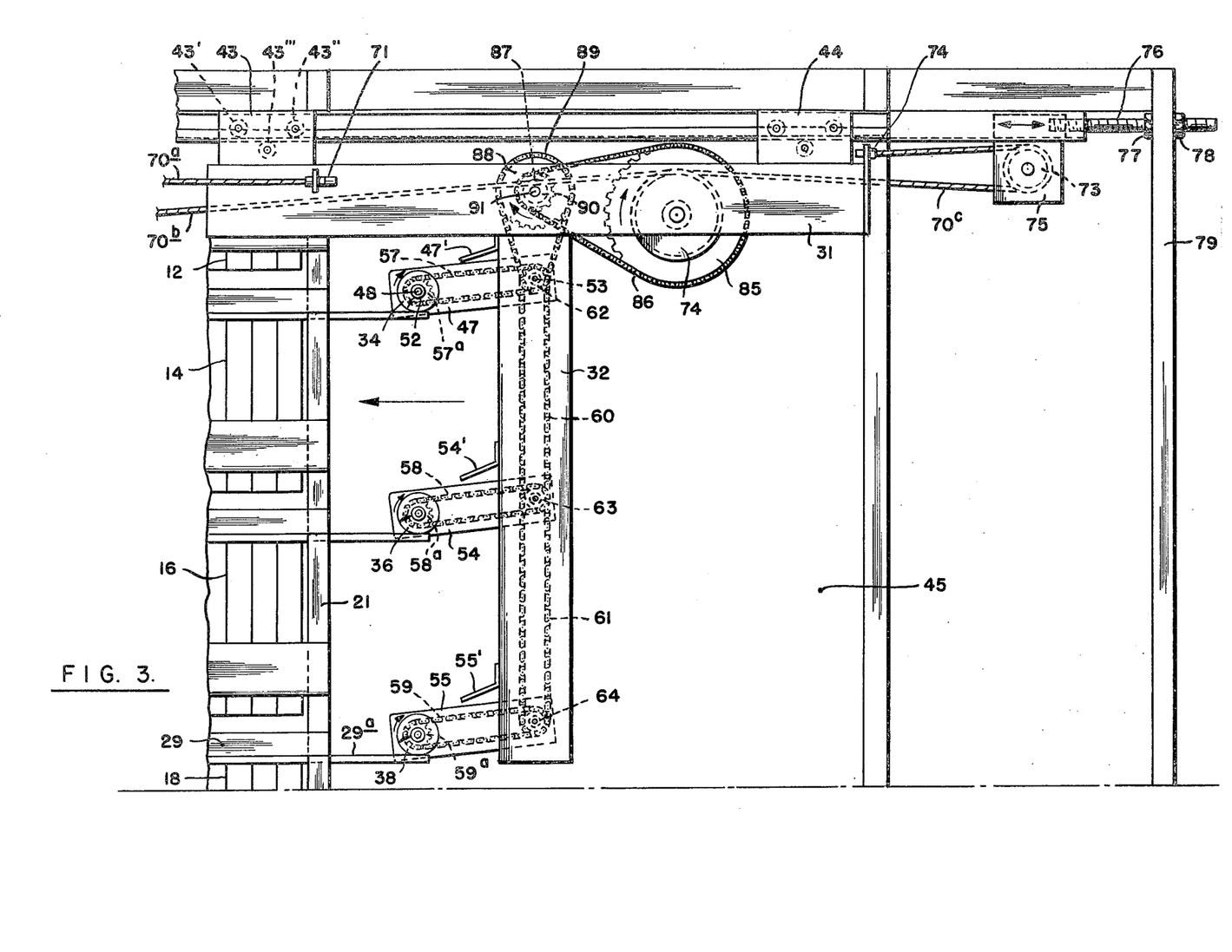
FIG. 3 is an enlarged fragmentary elevational view of the right-hand portion of the cage system illustrated in FIG. 1.

The augers 33-38 are disposed in close proximity with the top surfaces of the dropping boards during scraping. To this end, means is provided to urge the augers downwardly as they advance. As best seen in FIG. 3, the biasing means comprises a series of arms, such as the upper arm 47, which extend forwardly from the post 32 to mount the augers for movement ahead of the post as the carriage 31 advances. Each auger shaft, such as the auger shaft 48 is mounted in bearings 51 and 52 carried at the free end of the arm 47, and arm 47 is mounted to pivot about a horizontal axis through the post 32 by means of a shaft 53 extending transversely through the post 32. The lower pairs of augers are similarly mounted to arms 54 and 55. Preferably, the middle auger arm 54 is shorter than the arm 47 by about 2 inches, and the bottom auger arm 55 about 2 inches shorter than the middle arm 54 in order to cause droppings from the upper augers to fall clear of the lower augers. Thus, the pivotal mountings of the augers 34-38 to the post 32 permits them to float along the upper surfaces of the dropping boards to accommodate undulations in the dropping boards. It is noted that the right or near ends of the dropping boards are extended slightly such as indicated at 29a to support the augers when the manure scraping assembly 30 is in its home position in the storage bay 45.

The augers 34-38 are rotated by means located in their mounting arms 47, 54 and 55 and in the carriage post 32. For this purpose, the arms 47, 54 and 55 and the post 32 are hollow, and the front of the post 32 is provided with rectangular apertures through which the arms extend. In order to prevent manure droppings from entering the apertures and clogging the drive means, deflector plates 47', 54' and 55' (FIG. 3) are mounted to the post 32 above their respective arms 47, 54 and 55.

As best seen in FIG. 3 the augers 33-38 are driven by chains 57, 58 and 59 which are trained around sprockets mounted on the auger shafts and mounted inside the post 32. For instance, the chain 57 is trained around the sprocket 57a keyed to the auger shaft 48 and around one of a triple sprocket assembly 62 keyed to the shaft 53. The lower chains are similarly trained around auger shaft sprockets 58a and 59a and triple sprocket assembly 63 and double sprocket assembly 64 respectively. The sprockets in the various sprocket assemblies 62, 63 and 64 are offset laterally in the post 32 to accommodate the various chains and to permit power to be supplied to the lower sprocket assemblies 63 and 64 by chains 60 and 61.

A number of different means can be provided for powering the augers. For instance, while the carriage could be advanced by means of a self contained electric motor, utilizing a rechargeable battery, in the disclosed embodiment, the power is provided by the same means by which the carriage is advanced. In the present invention, the carriage displacing means includes a cable drive arrangement.

Referring now to FIG. 2, the cable drive arrangement for the carriage 31 comprises a cable 70 having an upper run 70a which is fastened adjacent its free end to the front of the carriage 31 by means of an anchor 71. The cable 70 extends around a pulley 72 at the left of far end of the cage bank 10 and has a lower run 70b which enters the carriage 31 and wraps several times clockwise around a capstan 74 which is rotatably mounted in the carriage 31. After wrapping about the capstan 74, the cable has a portion 70c which extends rearwardly around a pulley 73 and is connected by means of an anchor 74 adjacent the rear end of the carriage 31. The pulley 73 is mounted in a slide block 75 which is capable of being moved forwardly or rearwardly in the directions indicated by the arrows by means of an adjusting mechanism which, in the illustrated embodiment, comprises a jack screw 75 and a pair of lock nuts 77 and 78 located on opposite sides of an end upright 79. Rotation of the jack screw 75 in one direction or the other causes the pulley 73 to move right or left thereby increasing or reducing the amount of tension in the cable 70 in a well-known manner.

The carriage 31 is advanced forwardly, i.e. leftward in FIG. 2, when tension is applied to the upper run 70a of the cable 70 in the direction indicated by the arrow in FIG. 2. For this purpose, the pulley 72 is connected to a drive motor and gear reduction unit 80 which is mounted to an upright 81 at the far end of the cage bank 10. Rotation of the pulley 72 counterclockwise thereby tensions the upper run 70a of the cable and draws the carriage 31 leftward.

As the carriage 31 approaches the far end of the cage bank, a slight increase in slack develops in the cable 70. To take up the slack, an idler pulley 82 is mounted on the end of an arm 83 which is pivotally fastened to the drive unit 80. An extension spring 84 biases the idler pulley 82 downwardly and thereby takes up excess slack in the cable 70 as the carriage 31 approaches the drive unit 80 at the far end of the cage bank 10.

Referring now to FIG. 3, it will be noted that when some tension is applied leftward on the top run 70a of the cable 70, some tension is also applied rightward on the rear end 70c of the cable. The differential in tension, and the clockwise wrapping of the cable about the capstan 74, causes the capstan 74 to rotate in the clockwise direction as the carriage 31 advances leftward in the direction indicated by the arrow in FIG. 3.

In order to transmit power from the capstan 74 to the augers 34–38, a drive sprocket 85 is connected to the capstan 74 to rotate therewith. A chain 86 connects the drive sprocket 85 to a smaller sprocket 87 which rotates on a common shaft 91 with a larger sprocket 88. A chain 89 connects the larger sprocket 88 with the auger-drive sprocket assembly 62 located in the upper end of the post 32. By virtue of the relative sizes of the sprockets, the rotational velocity of the capstan 74 is stepped-up and this causes the augers 34–38 to rotate at the considerably higher rotational velocities described heretofore. Thus, when the carriage 31 advances leftward through the cage bank 10, the augers 34–38 rotate rapidly in the directions indicated by the arrow in FIG. 3 to scrape the droppings from the dropping boards.

In order to prevent the augers from rotating in the reverse direction when the carriage 31 is displaced rightward on its return stroke through the cage bank 10, a sprag clutch 90 is provided in the drive transmission in the carriage 31. Preferably, the sprag-clutch 90 is interposed between the hub of the sprocket 87 and the shaft 91 to which its companion sprocket 88 is keyed. Thus, the sprag clutch 90 can function in a well-known manner to permit power to be transmitted to the various drive sprockets in the carriage post 32 when the capstan 74 is rotating in the clockwise direction as indicated in FIG. 3 while preventing such power from being supplied when the capstan 74 rotates in the opposite direction such as occurs when tension is applied leftward in the lower cable run 70b to reverse the motion of the carriage 31 through the cage bank.

Preferably, the drive unit 81 is electrically powered, and a one horsepower motor has been found to provide adequate power to advance the carriage and rotate the augers in the manner discussed. Appropriate electrical controls (not shown) are provided to energize and de-energize the drive unit 80. For instance, a limit switch is provided at the far end of the cage bank 10 to interrupt power to the drive unit 80 after the carriage has traversed the entire length of the cage bank 10. The controls may then either cause the carriage 31 to return to its home position or to rest at the far end of the cage bank for a period of time before moving toward its home position. A limit switch located at the near end of the cage bank stops the motion of the carriage 31 in its home position. A limit switch is also provided to de-energize the drive unit 80 in the event of excess slack in the cable 70 as detected by over-travel of the idler pulley arm 83. If desired, a timer can be provided among the controls to operate the drive unit 80 automatically at predetermined time intervals.

In order to handle the manure to promote drying, it is desirable for the carriage to advance through the cage bank on one day, to remain at the far end of the cage bank for a substantial period of time (about 24 hours) and then to be returned to the home position. During the return motion of the carriage it is highly desirable for the augers to rotate in the same direction as when the carriage was advancing forwardly during the scraping. This is because when the carriage moves to the home position with the augers rotating in the same direction as they rotated when the carriage moved forwardly, the augers agitate the droppings on the dropping boards and thereby initiate an aerating or drying action which facilitates later scraping and handling of the manure. Such aeration also provides a slight cooling effect in the cage bank.

Figure 4:
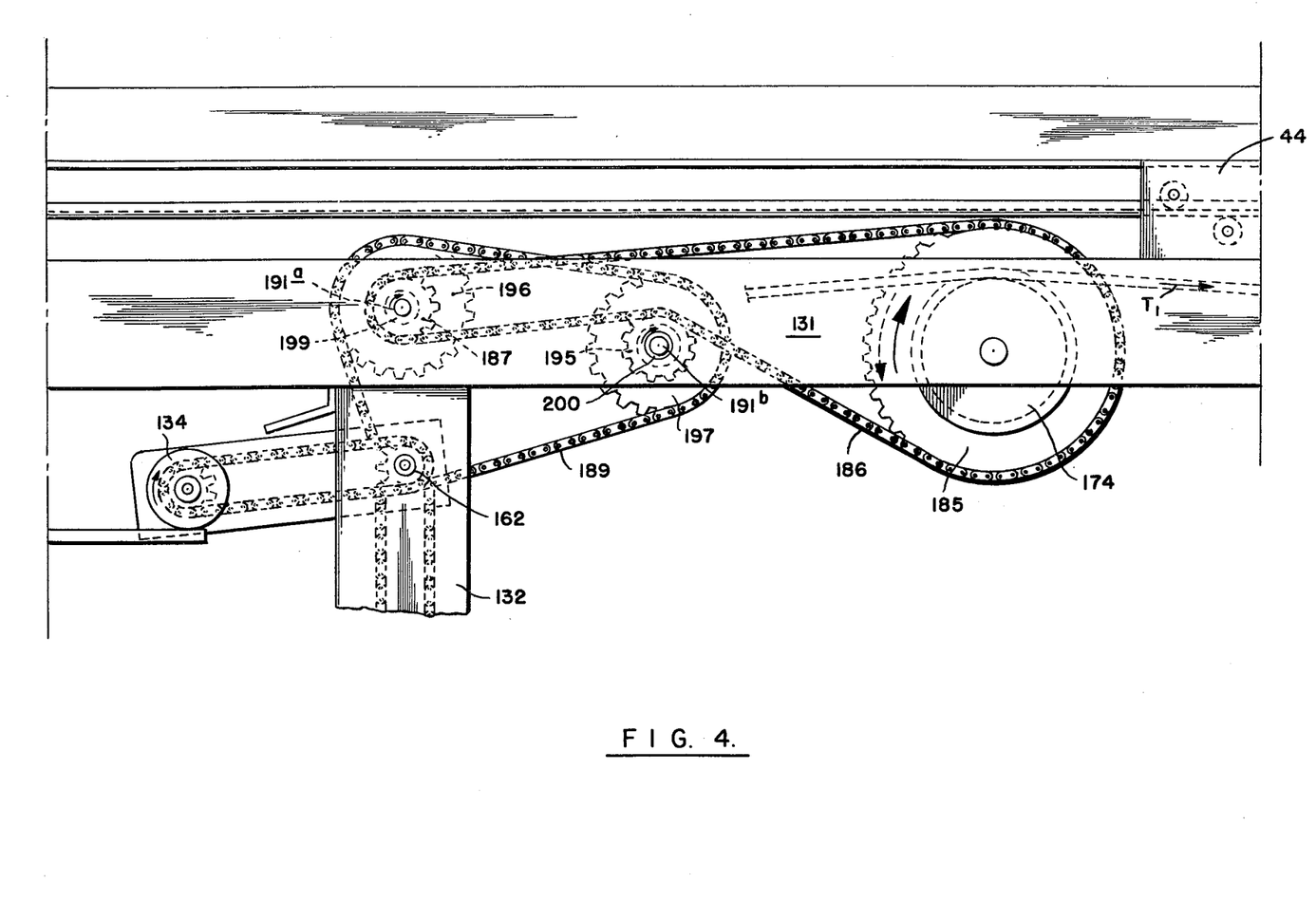
FIG. 4 is an enlarged fragmentary view illustrating automatic means utilized in conjunction with the manure removal apparatus to control the rotational direction of the augers.

To this end, a modified embodiment is provided, whereby means operates atuomatically to maintain the rotational direction of the augers by sensing the change in direction of differential tension across the capstan 74. Referring now to FIG. 4, a sprocket 185, like the sprocket 85 in FIG. 3, is mounted in a carriage 131 and is connected via chain 186 to a pair of sprockets 187 and 195 mounted on shafts 191a and 191b in the carriage 131. The chain 186 passes around and under the upper sprocket 187 and over the lower sprocket 195. A second pair of sprockets 196 and 197 are offset with respect to the sprockets 187 and 195 and are keyed to the same shafts 191a and 191b, respectively. The second pair of sprockets 196 and 197 are connected via chain 189 to the uppermost sprocket assembly 162 mounted adjacent the top of the column 132 much like the sprocket 62 which, in FIG. 3, drives the upper augers 34, 35 via chain 57. A pair of one-way sprag clutches 199 and 200 are interposed between the hubs of the sprockets 187 and 195 and their shafts 191a and 191b, respectively. The sprag clutches 199 and 200 are arranged so that their driving directions are indicated by the arrows in FIG. 4. Thus, the sprag clutch 199 associated with the sprocket 187 drives the shaft 191a and sprocket 196, and via the chain 189 the sprocket assembly 162 and auger 132 when the differential tension $T_1$ across the capstan is in the direction indicated in FIG. 4 during forward movement of the carriage 131. In this situation, the sprag clutch 200 overruns the shaft 191b so that the sprocket 197 is not driven. When, however, the direction of differential tension $T_1$ changes to that opposite the direction indicated in FIG. 4, the capstan 174 and associated sprocket 185 rotate in the direction indicated by the dashed lines, and this causes the chain 186 to reverse its direction of movement. This in turn causes the sprocket 195 to drive the sprag clutch 200 in the direction indicated by the arrow, whereby the sprag clutch 200 causes the sprocket 197 to drive the chain 189 and thereby to continue to drive the sprocket assembly 162 and auger 134 in the direction indicated by the arrow. With this mechanism, all the augers continue to rotate in the same direction regardless of the direction of differential tension in the drive cable and the direction of movement of the carriage 131. Thus, when the carriage 131 is advanced rearwardly through the cage bank 10 during its return stroke, the augers are driven in the same direction as the direction in which they normally rotate to displace droppings. When rotated in such direction, the augers merely agitate droppings on the board to aerate or fluff the same, thereby initiating a drying action while simultaneously avoiding the buildup of manure on the backside of the auger.

In view of the foregoing, it should be apparent that the present invention provides a high-density cage system which overcomes the limitations of the prior art cage systems. For instance, the four deck cage system of the present invention is capable of housing 360 birds per ten foot section with an overall width at the base of slightly in excess of five feet. In contrast, a three deck stairstep type cage system, such as manufactured by the assignee of the present application, is capable of housing 260 birds per ten foot section while occupying a little over seven feet of floor space at the base. Thus, for each cage bank, approximately two feet of floor space is saved in the poultry house, resulting in considerable savings in poultry house construction costs. In addition to the savings in floor space, the cage system of the present invention improves ventilation of the caged birds and affords ready access to even the uppermost cages in the bank. The manure handling apparatus and disclosed method facilitates the drying of manure and this, in turn, has advantages well known to those skilled in the art.

Thus, while a preferred embodiment and method have been described in detail, various modifications, alterations and changes may be made without departing from the spirit and scope of the present invention as defined in the appended claims.

We claim:

1. A high-density cage system comprising:
   a bank of cages disposed in vertically-spaced tiers with each tier including a pair of horizontally-spaced cage rows;
   a manure dropping board located above each row of cages in lower ones of said tiers;
   carriage means having an upright post portion movable lengthwise in the space between the cage rows;
   means for displacing said carriage means lengthwise of said cage rows;
   auger means extending laterally outward from said post in opposite directions above each dropping board; and
   means for rotating said auger means upon lengthwise movement of the carriage to displace manure droppings inwardly on the dropping boards toward a collection location centrally below the cage bank; whereby each dropping board is cleared of manure.

2. A high-density cage system according to claim 1 wherein said auger means includes a pair of helical blades having opposite pitch on opposite sides of said post and said auger rotating means turns said blades in a direction to cause the droppings to be displaced inwardly on the dropping boards toward the center of the cage bank.

3. A high-density cage system according to claim 2 wherein said blade rotating means includes a common shaft mounting both blades, means connected to said shaft for rotating the same, and means for biasing said shaft and blades downwardly into proximity with their associated dropping boards.

4. A high-density cage system according to claim 3 wherein said shaft biasing means includes an arm protruding forwardly from the post portion of the carriage, bearing means rotatably mounting said shaft to said arm adjacent its forward end, and means pivotally connecting the rear end of the arm to the post.

5. A high-density cage system according to claim 1 including means extending in said post for transmitting power to the auger rotating means.

6. A high-density cage system according to claim 5 including means mechanically coupling said power transmitting means in said post to said carriage displacing means for causing the auger to rotate upon movement of the carriage.

7. A high-density cage system according to claim 6 wherein said carriage displacing means includes pulleys located at opposite ends of said cage bank, a cable trained around said pulleys and connected adjacent its ends to said carriage, and means for driving at least one of said pulleys for applying differential tension to said cable and thereby advancing said carriage.

8. A high-density cage system according to claim 7 where said mechanical coupling means includes a capstan carried in said carriage and engaged by said cable to rotate in response to relative tension on said cable, and step-up transmission means connecting said capstan to said power transmitting means in said post for causing the auger to rotate at a higher rotational velocity than said capstan.

9. A high-density cage system according to claim 8 wherein said capstan to power transmitting connecting means includes means operable automatically upon a change in direction of differential tension on the cable to cause the auger to continue to rotate in the same direction as before the change in tension direction.

10. A high-density cage system according to claim 1 wherein said cage rows are stacked vertically in substantial alignment with one another and said dropping boards are disposed substantially horizontally above said cage rows.

11. A high-density cage system according to claim 10 including at least a pair of upright frames at spaced locations mounting said cage tiers in said vertically and horizontally spaced relation with at least one tier located intermediate upper and lower tiers, and including bracket means extending inwardly from said frames and terminating in said intermediate cage rows to mount said rows and to provide air space completely around the cage rows in said intermediate tier.

12. A high-density cage system according to claim 11 wherein said tiers are four in number and said intermediate tiers are two in number.

13. A high-density cage system according to claim 1 including elevated rail means extending lengthwise of said cage rows, truck means mounting said carriage to advance along the underside of said rail means, and means connecting said post to the underside of said carriage so as to depend therefrom into the spaces between cage rows.

14. A high-density cage system according to claim 13 including at least a pair of frames supporting said cage rows in said spaced relation and mounting said rail means at said locations.

15. A high-density cage system according to claim 14 and including means located between said frames to support said rail means on the uppermost tier of cages.

16. A high density cage system according to claim 15 where said rail means includes a monorail.

17. A high-density cage system, comprising:
   at least a pair of upright frames disposed in spaced relation;
   a bank of cages disposed in tiers extending between said frames in vertically-spaced relation and supported thereby;
   each cage tier including a pair of cage rows disposed in horizontally-spaced relation to define gaps between the insides of the rows in each tier;

a dropping board located above each row in the lower ones of said tiers;

rail means supported by the frames and overlying the gaps between said cage rows;

carriage means movable along said rail means lengthwise of said cage rows;

means for displacing said carriage means along said rail means;

rotary blade means carried by said carriage means and extending laterally outward for overlying said dropping boards; and means for rotating said blade means about a substantially horizontal axis;

whereby the blade means displaces droppings on the dropping boards as the carriage means advances along the cage rows.

18. A high-density cage system according to claim 17 wherein said rotary blade means includes helical blades of opposite pitch overlying the dropping boards in proximity therewith for displacing droppings toward the gaps between the cage rows when rotated in one direction.

19. A high-density cage system according to claim 18 wherein said blades rotate about 16 revolutions per foot of linear movement of the carriage.

20. A high-density cage system according to claim 19 wherein said carriage advances at a rate of about 25 ft/min.

21. A high-density cage system according to claim 17 including power transmitting means mounted to said carriage and coupled to said carriage displacing means for causing said blade means to rotate in response to displacement of the carriage means.

22. A cage assembly according to claim 21 wherein said power transmitting means includes a capstan rotatably mounted in said carriage, means coupling said capstan to said power transmitting means, a cable wrapped around said capstan, and means for applying differential tension to said cable for rotating said capstan and through said power transmitting means to rotate said blade means.

23. A high-density cage system according to claim 22 wherein said tension applying means includes pulleys located at opposite ends of said cage bank with said cable being trained around said pulleys, means connecting said cable adjacent its ends to said carriage, and means for driving at least one of said pulleys, whereby the differential tension on the cable causes the blades to rotate as the carriage advances.

24. A high-density cage system according to claim 23 including means for adjusting the tension in said cable, said tension adjusting means including means for displacing the other of said pulleys toward and away from the cage bank.

25. A high-density cage system according to claim 23 including slack take-up means located adjacent said driven pulley for cooperating with said cable to take up excess slack in the cable due to motion of the carriage into proximity with the driven pulley, said take-up means including an idler pulley engaging said cable adjacent said driven pulley, an arm mounting said idler pulley to pivot relative to said cable, and elastic means connected to said arm for biasing said pulley arm transversely and thereby taking up excess slack in said cable as said carriage closely approaches said driven pulley.

26. A high-density cage system according to claim 17 wherein said dropping boards are disposed horizontally and said cage rows are stacked vertically in substantial vertical alignment with one another.

27. A high-density cage system according to claim 26 wherein said dropping boards are located in close proximity to their overlying cage rows with only sufficient clearance to accommodate said blade means.

28. Apparatus for simultaneously rotating and translating a rotary blade along a surface adapted to support particulate material to enable the rotary blade to operate on the particulate material, comprising: a carriage movable along said surface and mounting said rotary blade, means for guiding said carriage forwardly and rearwardly along said surface, a cable connected at opposite ends to said carriage and trained around pulleys located at opposite ends of said support surface, means for driving at least one of said pulleys, a capstan rotatably mounted in said carriage and engaged by said cable, and power transmitting means coupled to said capstan for transmitting rotary motion from the capstan to the rotary blade, whereby major tension applied to the cable in a direction toward the driven pulley causes the capstan to rotate and thereby to rotate the blade while simultaneously advancing the carriage along the support surface.

29. Apparatus according to claim 28 wherein said power transmitting means includes step-up means operable to cause the rotational velocity of the blade to exceed the rotational velocity of the capstan.

30. Apparatus according to claim 29 including means connected intermediate said capstan and said blade operable automatically in response to a change in the direction of differential tension on the cable to cause the blade to continue to rotate in the same direction during both forward and rearward motion of the carriage.

31. Apparatus according to claim 30 wherein said automatic means includes sprocket means coupled to said blade and a first pair of sprockets rotatably mounted on shafts in said carriage, a first chain trained around said pair of sprockets and said sprocket means, a second pair of sprockets mounted in said carriage for rotation coaxial with each of said first pair, a drive sprocket connected to said capstan and rotatable therewith, a second chain trained around said drive sprocket and over one of said second sprocket pair and under the other one of said second sprocket pair, and a one-way clutch means connecting said one of said second sprocket pair to its associated first sprocket for driving the same in one direction and another one-way clutch means connecting said other of said second sprocket pair to its associated first sprocket for idling the same when said first-mentioned one-way clutch is driving, whereby differential tension pulling the cable in one direction causes one of said one-way clutches to rotate said blade and differential tension pulling the cable in the opposite direction causes the other of said one-way clutches to rotate said blade in the same direction.

32. A method of agitating manure deposited on a manure dropping board disposed beneath stacked cages, comprising the steps of:

disposing above the dropping boards in close proximity therewith a blade rotatable about a substantially horizontal axis overlying the board;

advancing said rotary blade along said dropping board first in one direction and then in the opposite direction; and rotating said blade as it advances;

whereby as the blade rotates and advances the manure is agitated to facilitate aeration and drying of the same.

33. The method according to claim 32 including the steps of arresting motion of the blade after it has advanced in said forward direction across the board, allowing a substantial period of time to elapse after said motion has been arrested, and advancing the blade in the rearward direction along the board while rotating the same.

34. The method according to claim 33 wherein said substantial period of time is at least about 24 hours.

35. The method according to claim 34 wherein said blade is helical and operates when rotated in one direction to displace manure axially along its length and including the step of rotating the blade in said one direction during both forward and rearward translation of the blade along the board.

* * * * *